United States Patent
Wu

(10) Patent No.: US 6,463,427 B1
(45) Date of Patent: Oct. 8, 2002

(54) USE OF OBJECT SIGNATURE PROPERTY AS A SEARCH PARAMETER DURING SYNCHRONIZATION OF OBJECTS ON A COMPUTER

(75) Inventor: Charles Wu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/268,472

(22) Filed: Mar. 16, 1999

(51) Int. Cl.[7] .............................................. G06F 17/30
(52) U.S. Cl. ..................... 707/3; 707/6; 707/8; 707/10; 707/201; 707/203; 707/204
(58) Field of Search ............................ 707/8, 10, 103, 707/201, 203, 204, 3, 6; 709/400

(56) References Cited

U.S. PATENT DOCUMENTS

| | | | | |
|---|---|---|---|---|
| 3,878,384 A | * | 4/1975 | Bowker ................... | 235/151.3 |
| 5,473,691 A | * | 12/1995 | Menezes et al. .............. | 380/25 |
| 5,479,654 A | * | 12/1995 | Squibb ........................ | 707/201 |
| 5,684,990 A | * | 11/1997 | Boothby ...................... | 707/201 |
| 6,044,381 A | * | 3/2000 | Boothby et al. ............. | 707/201 |
| 6,052,735 A | * | 4/2000 | Ulrich et al. ................ | 709/236 |
| 6,101,507 A | * | 8/2000 | Cane et al. .................. | 707/204 |
| 6,125,369 A | * | 9/2000 | Wu et al ..................... | 707/201 |
| 6,141,664 A | * | 10/2000 | Boothby ...................... | 707/201 |
| 6,263,362 B1 | * | 7/2001 | Donoho et al. ............. | 709/207 |

OTHER PUBLICATIONS

"Microsoft Outlook Objects", Microsoft Office Developer Forum–. . .Guide–Microsoft Outlook Objects, Chapter 5, http://www.microsoft.com/officedev/articles/opg/005/005.htm, Feb. 3, 1997.*

R. Byrne, "The Microsoft Outlook 97 Automation Server Programming Model", Mar. 3, 1997.*

"RecurringEvent Object", wysiwyg://61/http://msdn.microsoft. . . y/sdkdoc/exchange/spchap381h0.htm, published at least by Mar. 11, 1999.*

"AppointmentItem Object", wysiwyg;//16/http://msdn.microsoft. . . rary/sdkdoc/mapi/oleobjaf5flg.htm, published at least by Mar. 9, 1999.*

"RecurrencePattern Object", wysiwyg://11/http://msdn.microsoft. . . rary/sdkdoc/mapi/oleobjis3wvo.htm, published at least by Mar. 11, 1999.*

* cited by examiner

Primary Examiner—Jean M. Corrielus
(74) Attorney, Agent, or Firm—Westman, Champlin & Kelly

(57) ABSTRACT

Disclosed are methods of searching a list or table of objects during synchronization between first and second object stores. One of the first and second object stores can be a previous synchronization state table. Using the method, a list of objects to be searched for changes and deletions is obtained during synchronization. The list of objects is then searched using as a search parameter an object signature determined as a function of particular properties associated with a particular object. Also disclosed are a computer system which implements the methods of the present invention, and a computer readable medium having computer executable instructions for performing the steps of the methods.

28 Claims, 7 Drawing Sheets

USE OF OBJECT SIGNATURE PROPERTY AS A SEARCH PARAMETER DURING SYNCHRONIZATION OF OBJECTS ON A COMPUTER

BACKGROUND OF THE INVENTION

The present invention relates to personal mobile computing devices commonly known as handheld portable computers. More particularly, the present invention relates to a system and a method for searching for changes and deletions of objects between a mobile device and a desktop computer.

Mobile devices are small electronic computing devices often referred to as personal desktop assistants. One such mobile device is the Handheld PC (or "H/PC") based on and including the Windows CE® brand operating system sold by Microsoft Corporation of Redmond, Wash. Although small, a wide variety of computing tasks and applications can be performed by such mobile devices, such as word processing, spread sheet programs, personal money managers, personal information managers (PIMs) and games, to name a few. In many respects, these programs are very similar to programs that reside on an individual's desktop computer. In some applications, the mobile device may not have as many functions as available on a desktop computer but, nevertheless, are quite valuable as a means for updating and changing data in the field where even a laptop computer may not be available or used conveniently.

PIMs typically include applications which enable the user of the mobile device to better manage scheduling and communications, and other such tasks. Some commonly available PIMs include scheduling and calendar programs, task lists, address books, and electronic mail (e-mail) programs. Some commonly commercially available PIMs are sold under the brand names Microsoft Schedule+® and Microsoft Outlook® and are commercially available from Microsoft Corporation of Redmond, Wash.

It is also common for mobile devices to be used in conjunction with one or more desktop computers. For example, the user of a mobile device may also have access to, and use, a desktop computer at work, at home, or both. A user may typically run the same types of PIMs on both the desktop computer and the mobile device (although the particular versions of the PIMs may be somewhat different from the desktop computer to the mobile device). Thus, it is quite advantageous for the mobile device to be designed to be coupleable to the desktop computer to exchange information with, and share information with, the mobile device.

The user may also typically make changes to the PIMs both on the mobile device, and at the desktop. Therefore, it is advantageous for the PIMs on both the mobile device and the desktop to contain the most up-to-date information, regardless of whether recent changes to the PIMs have been made on the mobile device or the desktop computer. The process of coupling the mobile device with the desktop computer, and integrating the information stored by the PIMs on the mobile device and the desktop computer such that the two contain the same updated information is referred to as synchronization.

The information stored by the PIMs or other application programs contains objects, with objects being defined as a collection of properties. One of the properties of an object is a long term identification number (ID) for the object. While there is no defined upper or lower limit for the length of the long term ID object property, an example of a long term ID length is 56 bytes. Considerably longer and shorter long term ID lengths are common.

In some conventional synchronizing techniques, to search for changes or deletions of objects during synchronization, the long term IDs of the objects are used as a search parameter. Then, if a match of long-term IDs is found between an object in an object store and an object in a previous synchronization state table, a time stamp comparison was used to determine if the objects had been changed since the previous synchronization. As a secondary check, a cyclic redundancy check (CRC) property value of the objects, which is determined as a function of other properties of the object, has been used to verify that the objects had been changed in a manner which requires synchronization. Generally, since the size of the long term ID varies greatly from object to object, this method of searching for changes or deletions during synchronization can be very slow.

SUMMARY OF THE INVENTION

Disclosed are methods of searching a list or table of objects during synchronization between first and second object stores. One of the first and second object stores can be a previous synchronization state table. Using the method, a list of objects to be searched for changes and deletions is obtained during synchronization. The list of objects is then searched using as a search parameter an object signature determined as a function of particular properties associated with a particular object. In some embodiments of the present invention, the object signature is a 32-bit cyclic redundancy check (CRC) value calculated using other properties of the particular object. However, in other embodiments, longer and shorter object signatures are used. In yet other embodiments, the object signature is a substantially unique identifier of the properties associated with an object, but is not a CRC determined value. In some of these embodiments, the object signature is preferably less than about 128 bits in length.

Also disclosed are a computer system which implements the methods of the present invention, and a computer readable medium having computer executable instructions for performing the steps of the methods.

DETAILED DESCRIPTION OF THE PREFERRED EMBODIMENTS

Figure 1:
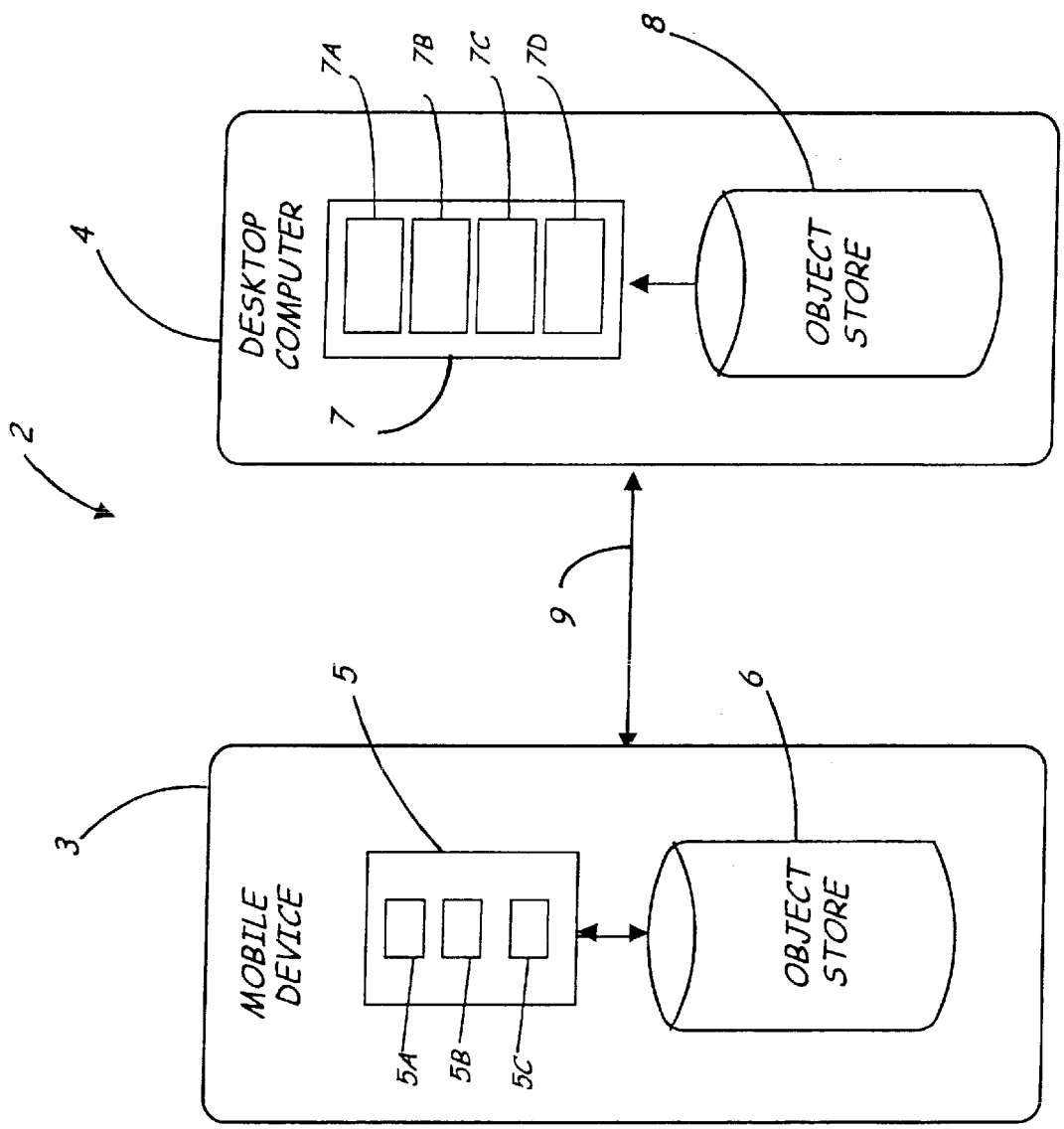
FIG. 1 is a block diagram illustrating an operating environment of the present invention.

FIG. 1 is a block diagram of a typical system or environment 2 in which the present invention operates. The environment 2 includes mobile device 3. Mobile device 3 includes one or more application programs indicated at 5A, 5B and 5C, and a store 6 used to store objects, data files and/or databases used by the application programs 5A–5C. A computer, herein illustrated as a desktop computer 4, also includes one or more application programs indicated at 7A, 7B, 7C and 7D, and a store 8 used to store objects, data files and/or databases used by the application programs 7A–7D.

In some circumstances, it is desired that at least some of the objects in stores 6 and 8 be either copied or transferred in order that the user can access the same information regardless as to whether the mobile device or the desktop computer 4 is being used. Mobile device 3 is connectable to the desktop computer 4 using one of a plurality of known connection mechanisms 9, such as a serial connection, an infrared link or a modem connection.

Before describing aspects of the present invention, a brief description of the desktop computer 4 and a typical mobile device, such as mobile device 3, will be helpful.

Figure 2:
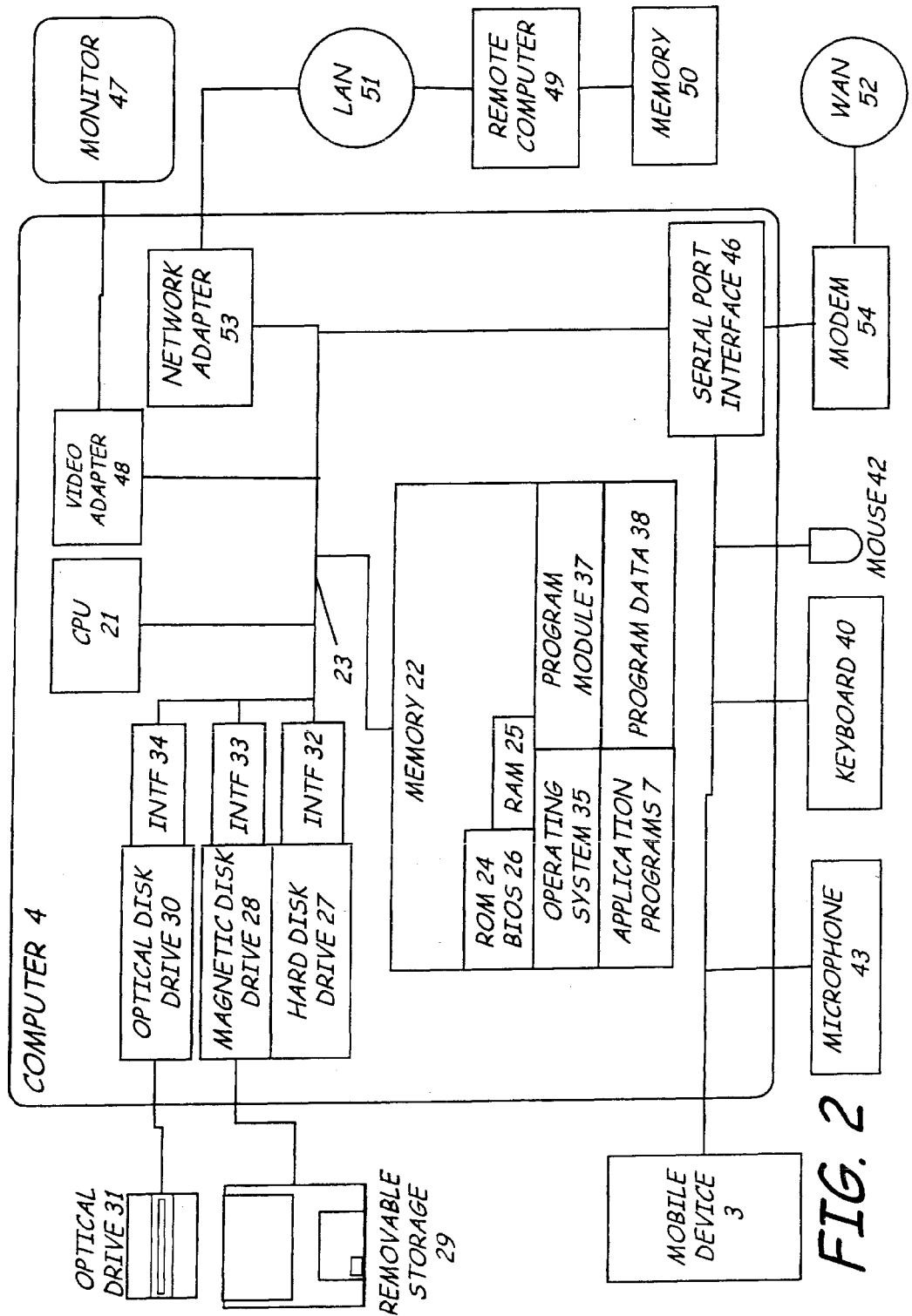
FIG. 2 is a block diagram of one embodiment of a conventional desktop computer used in conjunction with a mobile device.
Figure 3:
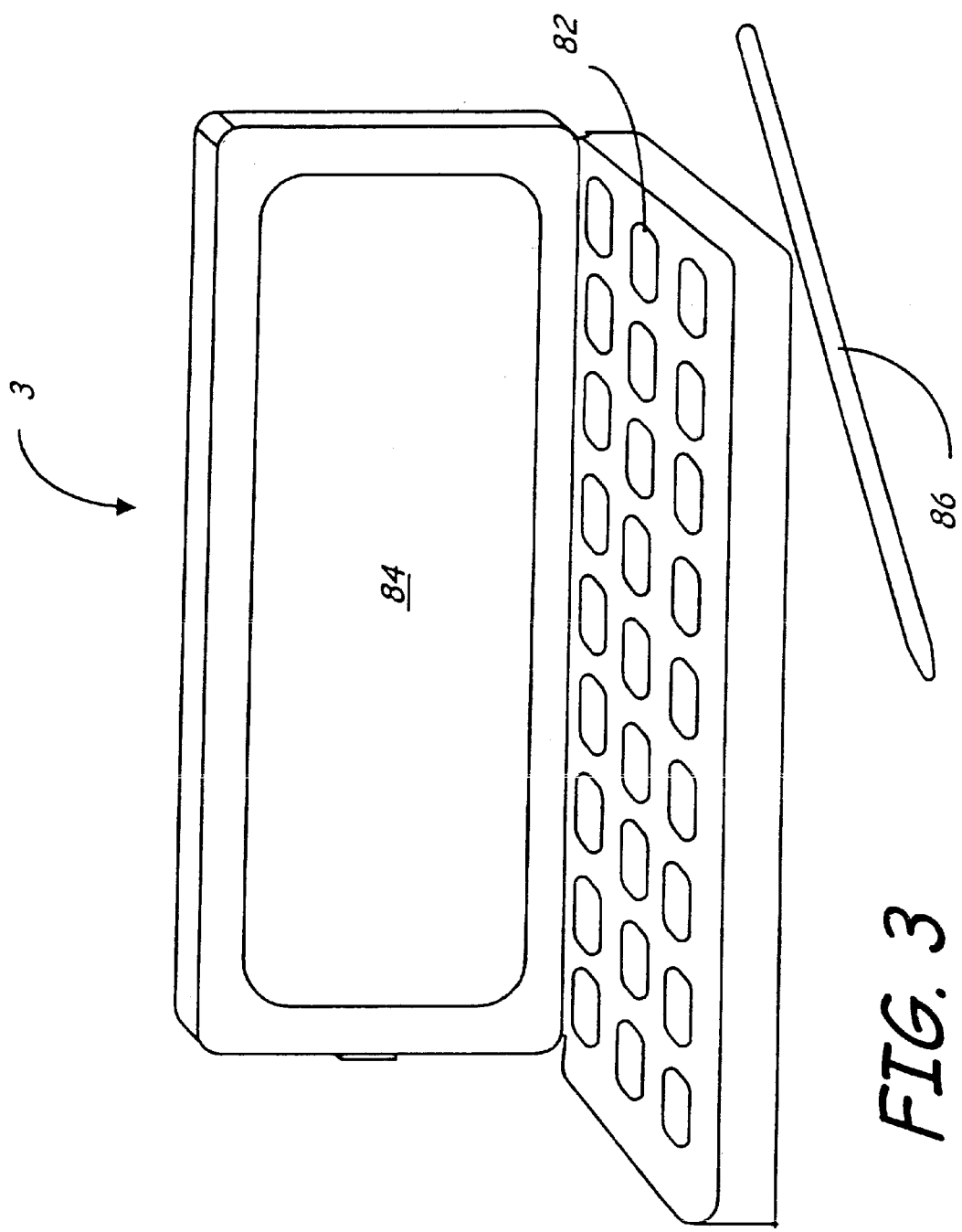
FIG. 3 is a simplified pictorial illustrating one embodiment of the mobile device in accordance with the present invention.
Figure 4:
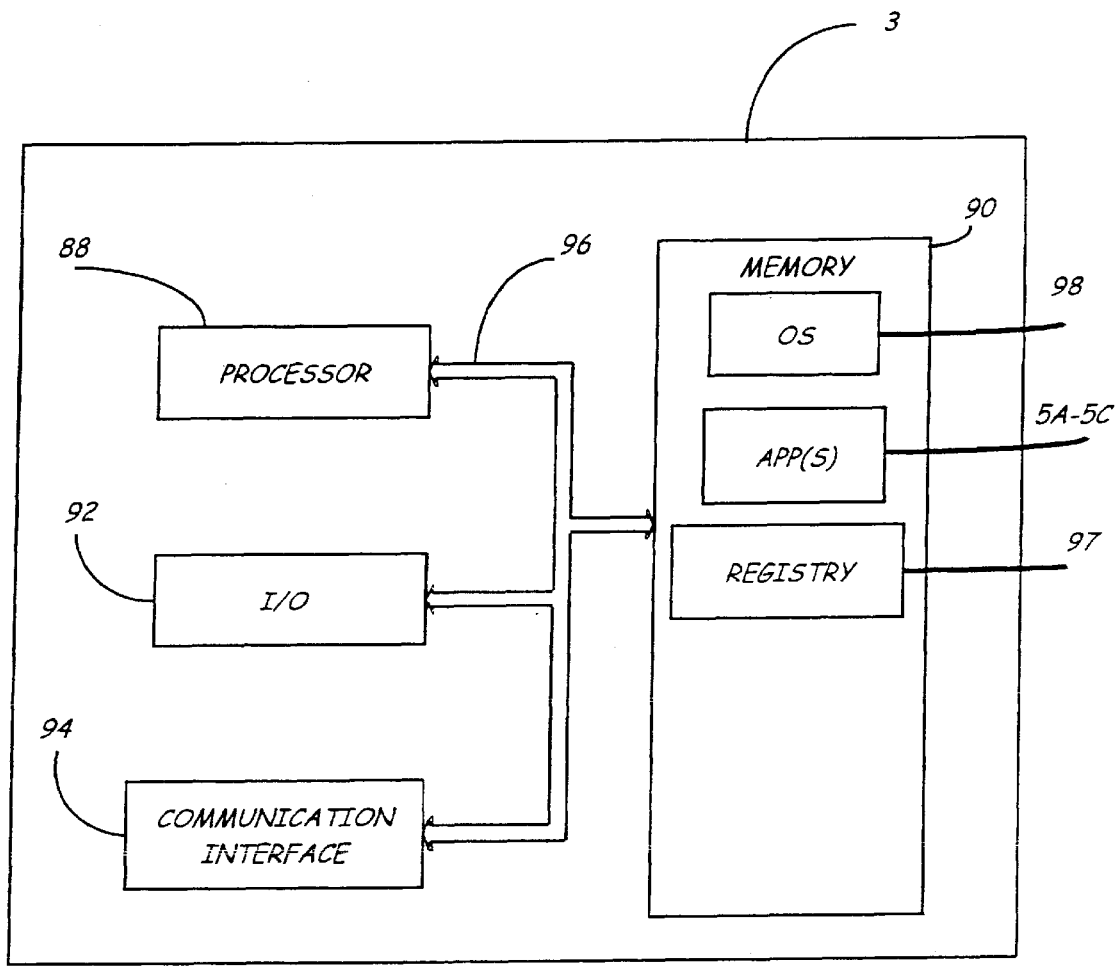
FIG. 4 is one embodiment of a simplified block diagram of the mobile device shown in FIG. 3.

FIGS. 2, 3 and 4 and the related discussion are intended to provide a brief, general description of a suitable computing environment in which the invention may be implemented. Although not required, the invention will be described, at least in part, in the general context of computer-executable instructions, such as program modules, being executed by the desktop computer 4 or the mobile device 3. Generally, program modules include routine programs, objects, components, data structures, etc., that perform particular tasks or implement particular abstract data types. Moreover, those skilled in the art will appreciate that the invention may be practiced with other computer system configurations, including other handheld devices, such as palmtop computers, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a general purpose computing device in the form of a conventional personal or desktop computer 4, including a central processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output system (BIOS) 26, containing the basic routine that helps to transfer information between elements within the desktop computer 4, such as during start-up, is stored in ROM 24. The desktop computer 4 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and the associated computer-readable media provide non-volatile storage of computer readable instructions, data structures, program modules and other data for the desktop computer 4.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more of the application programs 7A–7D, other program modules 37, and program data 38. A user may enter commands and information into the desktop computer 4 through input devices such as a keyboard 40, a pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker and printers (not shown).

The desktop computer 4 may operate in a wired or wireless networked environment using logic connections to one or more remote computers, such as a remote computer 49. The remote computer 49 may be another personal computer, a server, a router, a network PC, a peer device or other network node, and typically includes many or all of the elements described above relative to the desktop computer 4, although only a memory storage device 50 has been illustrated in FIG. 2. The logic connections depicted in FIG. 2 include a local area network (LAN) 51 and a wide area network (WAN) 52. Such networking environments are commonplace in offices, enterprise-wide computer network Intranets and the Internet.

When used in a LAN networking environment, the desktop computer 4 is connected to the local area network 51 through a network interface or adapter 53. When used in a WAN networking environment, the desktop computer 4 typically includes a modem 54 or other means for establishing communications over the wide area network 52, such as the Internet. The modem 54, which may be internal or external, is connected to the system bus 23 via the serial port interface 46. In a network environment, program modules depicted relative to the desktop computer 4, or portions thereof, may be stored in the remote memory storage devices, not shown. It will be appreciated that the network connections shown are exemplary and other means of establishing a communications link between the computers may be used. In the embodiment illustrated, the mobile device 3 also connects to the desktop computer 4 through the serial port interface 46.

The desktop computer 4 runs an operating system that is stored in any of the memory storage devices illustrated in FIG. 2 and executes on the processing unit 21. One suitable operating system is a WINDOWS® brand operating system sold by Microsoft Corporation, such as WINDOWS 95® or WINDOWS NT®, or other derivative versions of WIN- DOWS® brand operating systems, or another suitable operating system. Other suitable operating systems include systems such as "MACINTOSH OS" sold by Apple Corporation, and the "OS/2 PRESENTATION MANAGER" sold by International Business Machines (IBM).

FIG. 3 is a pictorial illustration of one preferred embodiment of the mobile device 3 which can be used in accordance with the present invention. The mobile device 3, in one embodiment, is a desktop assistant sold under the designation H/PC. The mobile device 3 has some components which are similar to those of the desktop computer 4. For instance, in one embodiment, the mobile device 3 includes a miniaturized keyboard 82, a display 84 and a stylus 86. The display 84 can be a LCD display having a contact-sensitive screen used in conjunction with the stylus 86. The stylus 86 is used to press or contact the display 84 at designated coordinates to accomplish certain user input functions. Of course, other configurations could be used as well. For example, user input mechanisms could be included such as a keypad, a track ball, and various types of miniaturized keyboards, or the like. In addition, the mobile device 3 may not be embodied as the H/PC brand of desktop assistant, but could also be implemented as another type of personal digital assistant (PDA), another personal organizer, a palmtop computer, a similar computerized notepad device, a phone or a pager.

FIG. 4 is a more detailed block diagram of the mobile device 3. The mobile device 3 preferably includes a microprocessor 88, memory 90, input/output (I/O) components 92 (which include the keyboard 82, and the touch sensitive display 84 and a serial interface 94). In one embodiment, these components are coupled for communication with one another over a suitable bus 96. The memory 90 can be implemented as non-volatile electronic memory such as a random access memory (RAM) with a battery back-up module (not shown) such that information stored in the memory 90 is not lost when the general power to mobile device 3 is shut down. A portion of memory 90 is preferably allocated as addressable memory for program execution, while the remaining portion of memory 90 is preferably used to simulate storage on a disk drive where memory 90, of course, can function as the store 6 in FIG. 1.

Memory 90 includes an operating system 98 and the application programs 5A–5C. The operating system 98, during operation, is preferably executed by the microprocessor 88. The operating system 98, in one embodiment, is the WINDOWS CE® brand operating system commercially available from Microsoft Corporation. The operating system 98 is preferably designed for mobile devices. The objects in the store 6 are preferably maintained by the application programs 5A–5C and the operating system 98, at least partially in response to calls to the exposed application program interfaces and methods. The application programs 5A–5C are not necessarily designed to be entirely compatible with corresponding application programs 7A–7D which execute on the desktop computer 4. For instance, there may not be precise one-to-one matching between the properties of specific object types.

In addition to the application programs 5A–5C and the operating system 98, memory 90 further stores a registry 97 used in operating systems such as WINDOWS CE® brand operating systems. The use of registries such as the registry 97 is conventional and provides information relating to the application programs 5A–5C installed on the mobile device 3. In a preferred embodiment, the registry 97 stores user settings of the application as well as where particular files are to be stored in tree-type directories, which is a common technique used in many operating systems.

Figure 5:
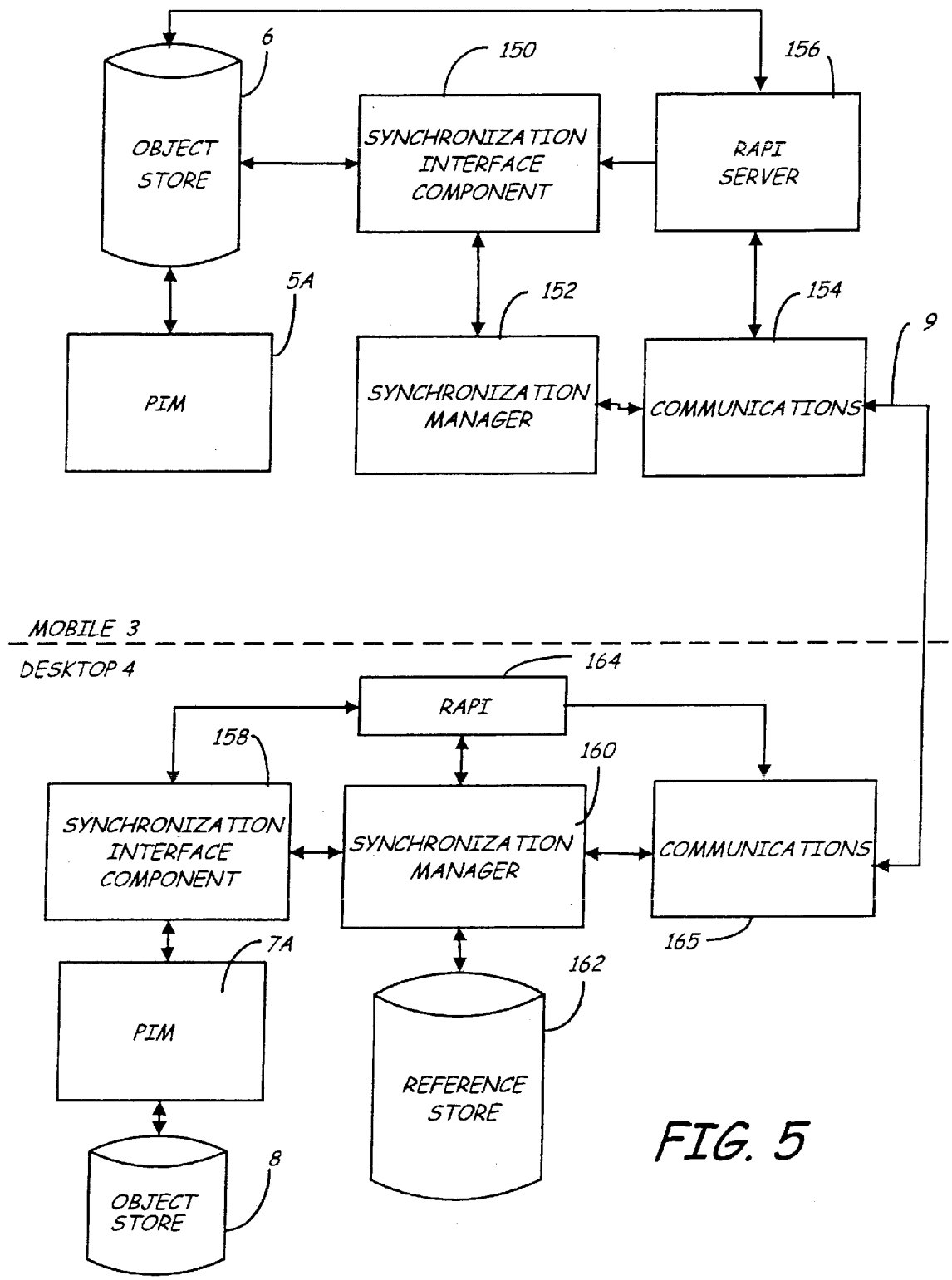
FIG. 5 is an architectural block diagram illustrating one embodiment of portions of the desktop computer shown in FIG. 2 and the mobile device shown in FIGS. 3 and 4 to illustrate synchronization of information stored in object stores on the desktop computer and the mobile device in accordance with the present invention.

FIG. 5 is an architectural block diagram illustrating one embodiment of architectural components of mobile device 3 and desktop computer 4 which are used in synchronizing objects stored in object store 6 on mobile device 3 and object store 8 on desktop computer 4. In addition to application or PIM 5A and object store 6, mobile device 3 includes synchronization interface component 150, synchronization manager 152, communications component 154 and remote application programming interface (RAPI) server 156.

Desktop computer 4 includes, in addition to application or PIM 7A and object store 8, synchronization interface component 158, synchronization manager 160, reference store 162, RAPI component 164, and communications component 165. Many of the components shown in FIG. 5 are used primarily to implement a suitable synchronization protocol.

Generally, synchronization manager 160 executes on desktop computer 4 and orchestrates synchronization between objects in object store 6 in mobile device 3, and objects in object store 8 in desktop computer 4. Synchronization manager 160 also maintains reference store 162 apart from desktop object store 8 as is described in greater detail below. Synchronization manager 160 implements the synchronization protocol to allow a comparison between corresponding objects stored in object store 6 in mobile device 3 and object store 8 in desktop computer 4, to receive objects from object store 8, and to update objects in object store 8. The synchronization protocol also facilitates the retrieval of objects stored in object store 6 in mobile device 3 through synchronization interface component 150 and synchronization manager 152, as well as communications component 154.

On the side of mobile device 3, the synchronization interface component 150 exposes application programming interfaces which synchronization manager 152 calls to read and store objects and object properties on object store 6. In general, the application programming interfaces allow the creation of databases for different types of objects, and allow application programs to write and read property names and values to and from respective objects within object store 6.

As discussed above, PIM 5A executes on mobile device 3 and-maintains object store 6. PIM 7A executes on desktop computer 4 and maintains object store 8. There are many different ways which PIMs 5A and 7A can store objects in object stores 6 and 8. However, in one embodiment, PIMs 5A and 7A create a distinct database for each object type. For example, different databases are created for appointments, tasks, electronic mail messages, etc. A predefined set of properties is supported for each object type, and each of the databases is assigned a name by the application program that creates it.

In an alternative embodiment, the application programs in PIMs 5A and 7A may use a single database for all object types, with the first property of each object defining the type of object. In any case, objects are uniquely identified within mobile device 3 and desktop computer 4 by object identifiers which are independent of the names assigned by the application programs creating the object.

Synchronization manager 160 is not necessarily closely associated with PIM 7A. Rather, it is an independent component which synchronizes objects from any application program that supports the appropriate desktop synchronization interfaces. Communication components 154 and 165 implement serial communications between the computers using connection mechanism 9.

Synchronization manager 160 communicates with PIM 7A and accesses object store 8 through synchronization interface component 158. Synchronization interface component 158 corresponds- generally to a dynamic linked library (PLL), and exposes one or more application program interfaces and methods. The interfaces and methods are preferably of the form known as store interfaces such as IReplStore and IReplObjHandler developed and published by the Microsoft Corporation for WINDOWS® brand operating system platforms. Those interfaces may, in turn, use interfaces such as messaging application programming interfaces (MAPI) and/or OLE Automation (or any other application programming interface) to communicate with the underlying PIM and object store. Synchronization interface component 158, and the associated application program interfaces and methods can be any suitable synchronization interface components designed for any particular application in PIM 7A. Because the application program interfaces are preferably standardized, they allow synchronization manager 160 to access and synchronize any number of different desktop PIMs, as long as the required interface methods are implemented for each PIM.

Reference store 162 provides a mapping between instances of objects stored in object store 6 on mobile device 3 and objects stored in object store 8 on desktop computer 4. Since the same object identifiers are not used by PIM 5A to identify objects on object store 6 as are used by PIM 7A to identify objects in object store 8, this mapping is required.

The present invention includes methods of synchronizing objects stored in first and second object stores. Generally, the methods of the present invention are described with reference to synchronizing a list of objects stored in object store 8 with a previous synchronization state table stored in reference store 162. However, the methods of the present invention can be used during synchronization of other objects as well. For example, the methods of the invention can be used during synchronization between object store 8 of desktop computer 4 and object store 6 of mobile device 3.

Figure 6A:
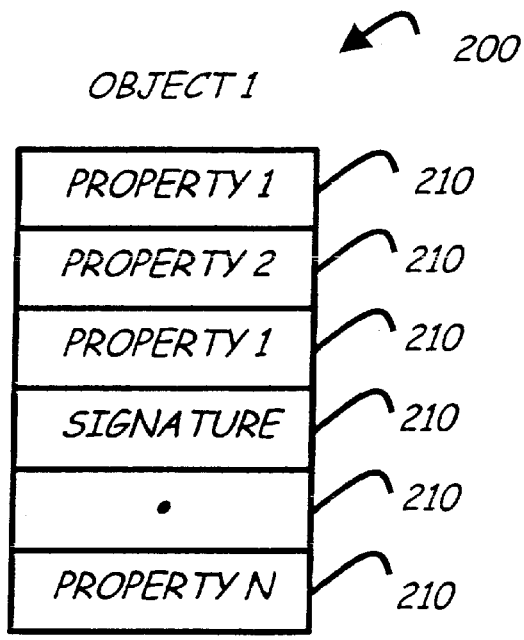
FIGS. 6A and 6B are diagrammatic illustrations of objects and object properties, respectively, of the type synchronized using the methods of the invention.
Figure 6B:
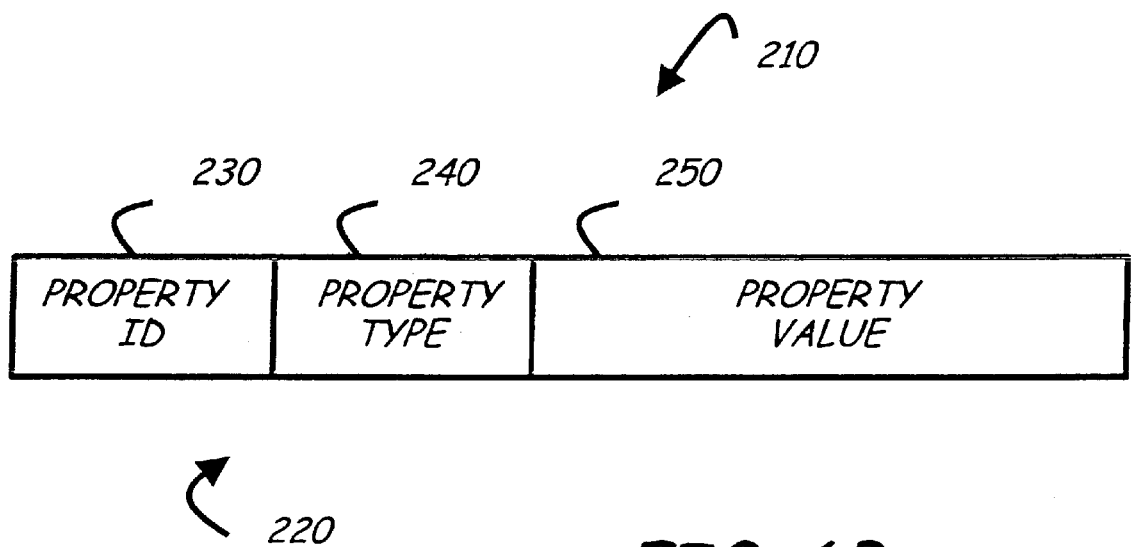

To aid in illustrating the present invention, a more detailed description of objects of the type synchronized using the inventive methods is provided. Referring to FIGS. 6A and 6B, an object 200 is defined as a collection of properties 210. Each of properties 210 includes a property tag 220 and a property value 250. Property tag 220 can be a 32-bit number, where the most significant 16 bits are the property ID 230, and the least significant 16 bits are the property type 240. Property value 250 is a collection of bits, the length of which depends upon property type 240.

In the method of the present invention, each object 200 to be synchronized includes a signature property (shown in FIG. 6A). In one embodiment, the signature property of each object is determined as a function of other properties, of the object, which are to be synchronized. Some embodiments of the invention, the signature property is a 32-bit cyclic redundancy check (CRC) value which is calculated using as inputs the properties to be synchronized in the particular object. By using a CRC value, determined as a function of properties to be synchronized, the signature property serves as a substantially unique identifier of the particular properties and values within the object. Because this largely unique identifier can be as small as 16 or 32 bits, searching using the signature property is substantially faster than searching using the long term ID property, which is typically of a substantially longer length.

Because a CRC value is dependent upon the order in which data is provided to the CRC calculation or calculator, it is important that the CRC signature property be calculated consistently. One such method for consistently calculating the CRC signature properties is described below.

First, the properties of a particular object are sorted using the property tag. The properties are then input to the CRC calculation in the sorted order. For each property in the sub-set of properties to be considered for synchronization in a particular object, the property value is provided to the CRC calculator first. If the property value is greater than 32-bits in length (i.e., if the property is a multi-value type), then the property value is provided to the CRC calculator 32-bits at a time. For these multi-value type properties, after all of the 32-bit strings have been provided to the CRC calculator, the counter portion of the property value (which is indicative of the number of 32-bit strings in the property value) is provided to the CRC calculator. If the counter is indicative of the fact that a particular property is a single value property, then the counter is not provided to the CRC calculator. After the property value of a particular property is provided to the CRC calculator, then the corresponding property tag is provided to the CRC calculator.

When calculating the CRC signature for particular types of objects, various methods can be used to obtain a signature value which will consistently be the same if no changes have occurred to properties of the object which are to be synchronized. For example, if a property of an object is missing, the property type returned in the list of properties can be a "property error type", and the property value can be indicative of this type of error as well. In this circumstance, it can be beneficial to not include this property type in the CRC calculation. Other specific cases in which the CRC signature calculation should be modified slightly are of course dependent upon the particulars of the property types being synchronized, as will be understood by those of skill in the art.

Referring back to FIG. 5, synchronization interface component 158 implements the methods of the invention of searching a list of objects to be synchronized using the object signature property as the search parameter. Calculation of the CRC signature property of individual objects can be implemented by synchronization interface component 158, or by other resources on desktop computer 4. Synchronization interface component 158 uses the signature property to search for objects to be synchronized between objects stored in object store 8 and objects in a previous synchronization state table stored in reference store 162. An exemplary embodiment of a method of searching a list of objects and a previous synchronization state table is discussed below with reference to FIG. 7.

Figure 7:
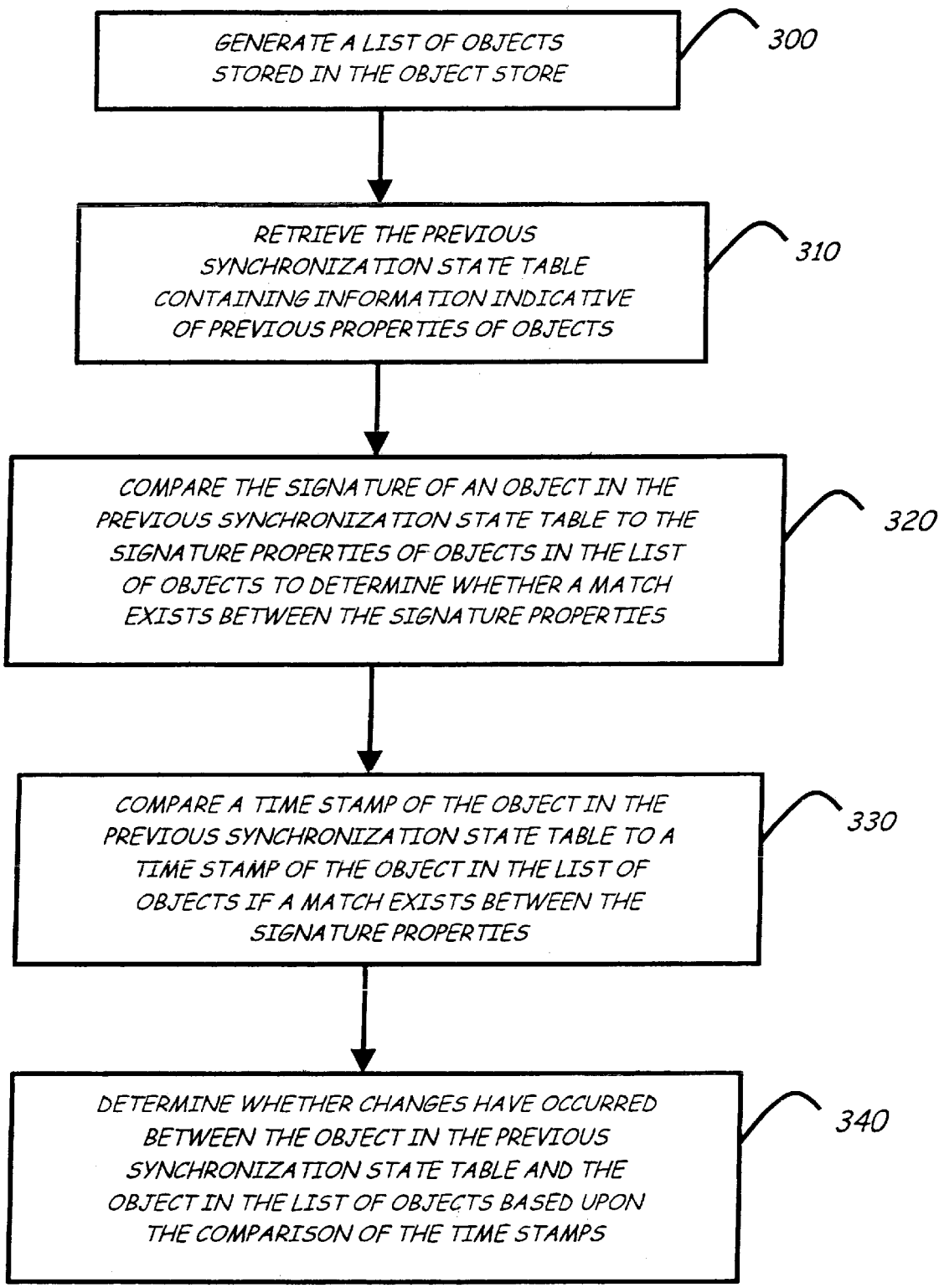
FIG. 7 is a flow diagram illustrating a method of the invention.

Illustrated at block 300 in FIG. 7, a first step of the inventive methods includes generating a list of objects stored in an object store. To generate the list, synchronization interface component 158 can utilize an application programming interface (API), such as the messaging application programming interface (MAPI) included in Microsoft Windows operation system to retrieve a list of objects stored in an object store such as object store 8.

Next, after generating a list of objects stored in the object store, the previous synchronization state table, containing information indicative of previous properties of objects, is retrieved from reference store 162 with the aid of synchronization manager 160. This step is illustrated at block 310 of FIG. 7. To determine whether a particular object in the previous synchronization state table or in the list of objects requires synchronization, synchronization interface component 158 compares the signature property of an object in the previous synchronization state table to the signature properties of objects in the list of objects to determine whether a match exists. This step is illustrated at block 320 in FIG. 7. If a match exists between signature properties of an object in the list of objects and an object in the previous synchronization state table, there is a very high likelihood that the objects correspond to one another. While it is possible to obtain identical CRC signatures for different objects having differing properties, such an occurrence will be relatively uncommon. However, if desired, to verify that the two objects with matching signature properties are corresponding properties eligible for synchronization, the long-term IDs of the two objects can be compared. The long-term ID of an object is uniquely indicative of the object, so a match of long-term IDs is conclusive. Since the long-term IDs are used for comparison only after a match of signature properties has been found, use of the long-term ID to verify the match does not introduce the disadvantages in prior art methods which searched using the long-term ID as a search parameter.

Once a signature property match between an object in the list of objects and an object in the previous synchronization state table has been found, the time stamp of the object in the previous synchronization state table is compared to the time stamp of the object in the list of objects. This step is illustrated at block 330 of FIG. 7. Then, as illustrated at block 340 in FIG. 7, a determination can be made whether changes have occurred between the object in the previous synchronization state table and the object in the list of objects based upon the comparison of time stamps. If the time stamps between the two objects having matching signature properties are the same, it can be determined that no changes have occurred between the objects, and that no synchronization between these objects is necessary.

If the time stamps between the two objects having matching signature properties are different, then the signature property of at least one of the object in the previous synchronization state table and the object in the list of objects is recalculated. Then, after recalculation, the signature properties of the two objects are again compared, and a determination as to whether changes have occurred between the objects can be made based upon the comparison. If the signature properties of the two objects again match after signature property recalculation, it can be determined that no changes requiring synchronization have occurred between the objects. However, if the signature properties of the two objects do not match after recalculation, then it can be determined that changes have occurred between the two objects and that synchronization is necessary.

While the signature property utilized in the methods of the present invention has been described as a CRC, it must be noted that the signature property can be a value other than a CRC calculated value. It is important that the signature property be a substantially unique identifier of a particular object so that if the properties of the object do not change, the signature property will remain the same. The signature property is preferably generated such that the likelihood of two or more non-corresponding objects having the same signature property is relatively low. As discussed above, during such an occurrence, a comparison of long-term IDs can be used to verify which the objects actually correspond. Further, while a 32-bit signature property has been described, the signature properties used in the present invention can be shorter or longer than 32-bits. In exemplary embodiments of the present invention, the signature property used as a search parameter during synchronization is less than about 128 bits. The primary criteria for the signature property is that it be a substantially unique identifier of a particular object and its corresponding properties, while also being substantially shorter in length then the long-term ID property used as the search parameter in the prior art.

Once the changes, additions and deletions are determined by synchronization manager 160, the items can be synchronized using conventional techniques.

Although the present invention has been described with reference to preferred embodiments, workers skilled in the art will recognize that changes may be made in form and detail without departing from the spirit and scope of the invention.

What is claimed is:

1. A computer-readable medium having computer-executable instructions for performing the steps of:

obtaining a list of objects to be searched for changed and deleted objects during synchronization of objects between an object store and a previous synchronization state table; and searching at least one of the list of objects and the previous synchronization state table for corresponding objects using as a search parameter an object identifier determined as a function of particular properties associated with an object to determine if the object has changed since a previous synchronization.

2. The computer-readable medium of claim 1, wherein the computer-executable instructions for performing the step of searching further includes computer-executable instructions for searching at least one of the list of objects and the previous synchronization state table for corresponding objects using as the object identifier one of a plurality of properties associated with the object, the one of the plurality of properties which serves as the object identifier being determined as a function of others of the plurality of properties associated with the object.

3. The computer-readable medium of claim 2, wherein the computer-executable instructions for performing the step of searching further includes computer-executable instructions for searching at least one of the list of objects and the previous synchronization state table for corresponding objects using as the object identifier a cyclic redundancy check value which is calculated using the others of the plurality of properties associated with the object.

4. The computer-readable medium of claim 2, having further computer-executable instructions for performing the step of comparing time stamps of first and second objects found to have matching object identifiers to determine whether at least one of the first and second objects has been changed and requires synchronization.

5. The computer-readable medium of claim 2, having further computer-executable instructions for performing the step of comparing long-term identification properties of first and second objects found to have matching object identifiers to determine whether at least one of the first and second objects has been changed and requires synchronization.

6. The computer readable medium of claim 2, having further computer-executable instructions for synchronizing changed and deleted objects found in the search.

7. The computer readable medium of claim 2, wherein the computer-executable instructions for performing the step of searching further includes computer-executable instructions for searching at least one of the list of objects and the previous synchronization state table for corresponding objects using as the object identifier a signature property having a length of less than about 128 bits.

8. The computer readable medium of claim 2, wherein the computer-executable instructions for performing the step of searching further includes computer-executable instructions for searching at least one of the list of objects and the previous synchronization state table using as the object identifier a signature property having a length of about 32 bits.

9. A method of synchronizing objects between an object store and a previous synchronization state table, the method comprising:

generating a list of objects stored in the object store;

retrieving the previous synchronization state table containing information indicative of previous properties of objects;

comparing a signature property of an object in the previous synchronization state table to a signature property of an object in the list of objects to determine whether a match exists between the signature properties, wherein the signature property of each particular object is based upon others of a plurality of properties associated with the particular object;

comparing a time stamp of the object in the previous synchronization state table to a time stamp of the object in the list of objects if a match exists between the signature properties; and determining whether changes have occurred between the object in the previous synchronization state table and the object in the list of objects based upon the comparison of the time stamps.

10. The method of claim 9, wherein determining whether changes have occurred further includes determining that no changes have occurred between the object in the previous synchronization state table and the object in the list of objects if the time stamps are the same.

11. The method of claim 9, wherein determining whether changes have occurred further includes:

recalculating the signature property of at least one of the object in the previous synchronization state table and the object in the list of objects if the time stamps are different;

comparing the signature property of the object in the previous synchronization state table to the signature property of the object in the list of objects after signature property recalculation; and determining whether changes have occurred between the object in the previous synchronization state table and the object in the list of objects based upon the comparison of the signature properties after signature property recalculation.

12. The method of claim 11, wherein determining whether changes have occurred between the object in the previous synchronization state table and the object in the list of objects further includes determining that no changes have occurred if the signature properties match after signature property recalculation.

13. The method of claim 11, wherein determining whether changes have occurred between the object in the previous synchronization state table and the object in the list of objects further includes determining that changes have occurred if the signature properties do not match after signature property recalculation.

14. The method of claim 9, wherein comparing the signature property of the object in the previous synchronization state table to the signature property of the object in the list of objects to determine whether a match exists between the signature properties further includes comparing signature properties having lengths of less than about 128 bits.

15. The method of claim 9, wherein comparing the signature property of the object in the previous synchronization state table to the signature property of the object in the list of objects to determine whether a match exists between the signature properties further includes comparing signature properties having lengths of about 32 bits.

16. The method of claim 15, wherein comparing the signature property of the object in the previous synchronization state table to the signature property of the object in the list of objects to determine whether a match exists between the signature properties further includes comparing cyclic redundancy check values associated with each of the object in the previous synchronization state table and the object in the list of objects.

17. A method of synchronizing objects between a first object store and a previous synchronization state table, the method comprising:

generating a list of objects stored in the first object store;

retrieving the previous synchronization state table containing information indicative of previous properties of objects;

searching for a match of a signature property of a first object in one of the table and the list with a signature property of an object in the other of the table and the list, wherein the signature property of each particular object is a function of a plurality of properties associated with the particular object; and determining whether the first object requires updating as a function of the search.

18. The method of claim 17, wherein determining whether the first object requires updating further comprises determining that the first object has been deleted since a previous synchronization if the first object is in the previous synchronization state table, but no match of the signature property of the first object is found in the list of objects.

19. The method of claim 17, wherein determining whether the first object requires updating further comprises determining that-the first object has been added since a previous synchronization if the first object is in the list of objects, but no match of the signature property of the first object is found in the previous synchronization state table.

20. The method of claim 17, wherein searching for a match of the signature property of the first object further includes searching for a match of the signature property of the first object having a length of less than about 128 bits.

21. The method of claim 20, wherein searching for a match of the signature property of the first object further includes searching for a match of a cyclic redundancy check property of the first object.

22. A computer system, comprising:

a first object store configured to store first objects;

a synchronization component configured to synchronize the first objects from the first object store with second objects from a second object store, the synchronization component being configured to search the first objects and the second objects for changes and deletions using as a first parameter an object signature, the object signature for a particular object being a property of the particular object determined as a function of a plurality of other properties of the particular object.

23. The computer system of claim 22, wherein the second objects from the second store comprise a previous synchronization state table.

24. The computer system of claim 23, wherein the synchronization component is configured to search at least one of a list of the first objects and the previous synchronization state table for a match of signature properties between an object in the list of first objects and an object in the previous synchronization state table.

25. The computer system of claim 22, wherein the synchronization component is configured to search the first objects and the second objects for changes and deletions using as the first parameter the object signature having a length of less than about 128 bits.

26. The computer system of claim 25, wherein the synchronization component is configured to search the first objects and the second objects for changes and deletions using as the first parameter the object signature having a length of about 32 bits.

27. The computer system of claim 25, wherein the synchronization component is configured to search the first objects and the second objects for changes and deletions using as the first parameter a cyclic redundancy check object property, the cyclic redundancy check property of each object being determined as a function of a plurality of other properties of the object.

28. The computer system of claim 25, wherein the synchronization component is configured to identify changes and deletions between the first objects and the second objects using as a second parameter time stamps of objects having matching object signatures.

* * * * *

UNITED STATES PATENT AND TRADEMARK OFFICE
CERTIFICATE OF CORRECTION

PATENT NO.     : 6,463,427 B1
DATED          : October 8, 2002
INVENTOR(S)    : Charles Wu It is certified that error appears in the above-identified patent and that said Letters Patent is hereby corrected as shown below:

<u>Title page,</u>
Item [56], OTHER PUBLICATIONS, third entry, change "/spchap381" to
-- /spchap3_81 --.
Fourth entry, change "wysiwyg;" to -- wysiwyg: --; and change "/oleobjaf5flg" to
-- /oleobjaf_5flg --.
Fifth entry, change "/oleobjis3wvo" to -- /oleobjis_3wvo --.

<u>Column 7,</u>
Line 3, change "(PLL) :" to -- (DLL) --.

Signed and Sealed this

Twenty-eighth Day of January, 2003

JAMES E. ROGAN
*Director of the United States Patent and Trademark Office*